April 17, 1951 — K. J. NELSON — 2,549,117
FLUIDIZED CARBONIZATION
Filed Oct. 2, 1946
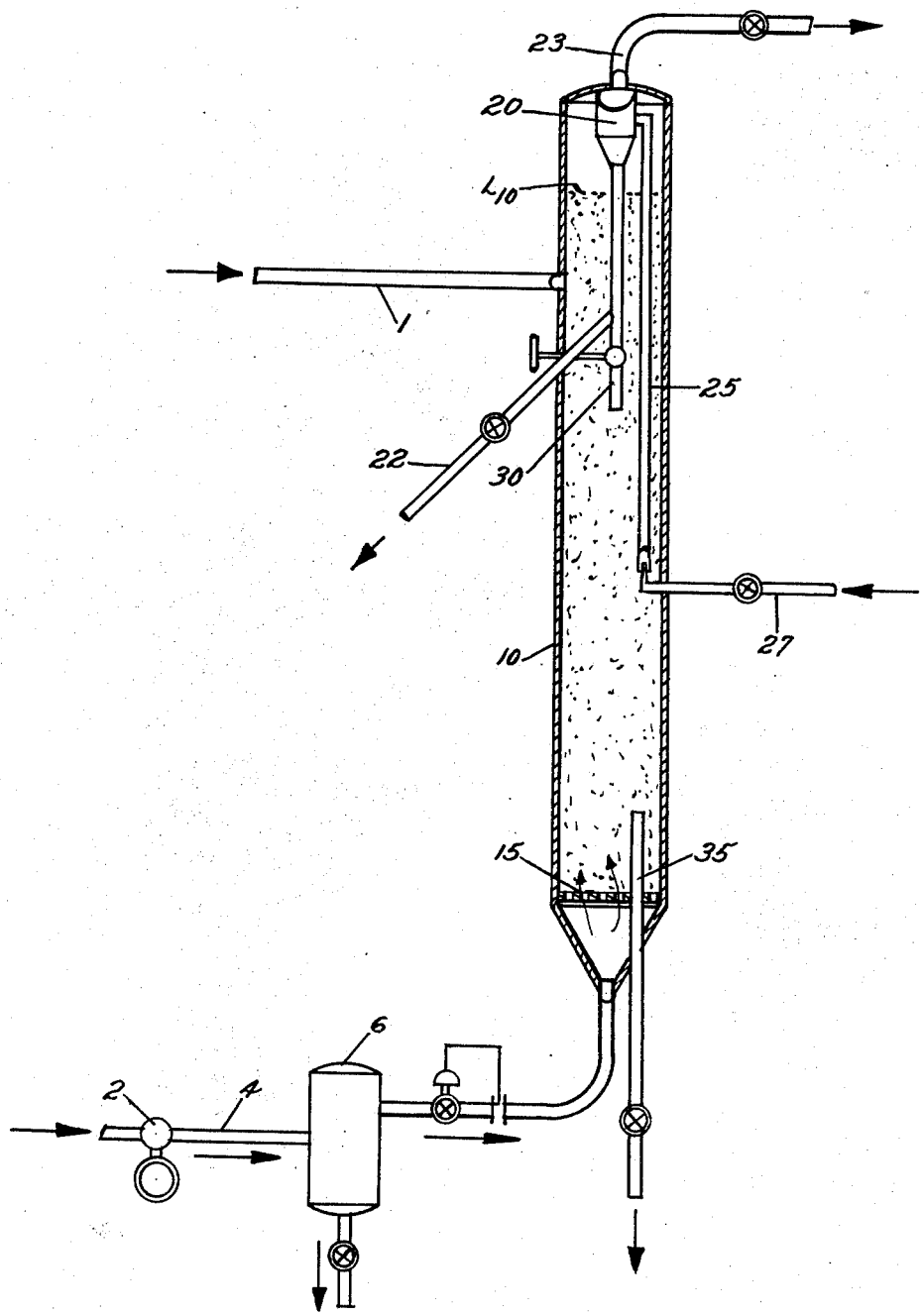
Karl J. Nelson Inventor
By P. J. Whelan Attorney Patented Apr. 17, 1951

2,549,117

UNITED STATES PATENT OFFICE 2,549,117

FLUIDIZED CARBONIZATION

Karl J. Nelson, Cranford, N. J., assignor to Standard Oil Development Company, a corporation of Delaware Application October 2, 1946, Serial No. 700,684

9 Claims. (Cl. 202—6)

The present invention relates to the carbonization of carbonaceous fuels such as all types of coal, lignites, cellulosic materials including lignin, oil shale, tar sands, as well as heavy oil residues, asphalts, etc. to produce coke and valuable volatile materials. More particularly, the invention is concerned with an improved method and apparatus for the carbonization of these fuels in a dense turbulent bed of finely divided solids fluidized by an upwardly streaming gas.

The application of the so-called fluid solids technique to the carbonization of solid carbonizable fuels is well known in the art. In this process finely divided carbonizable solids, such as coal, having a fluidizable particle size of say about 4 to 400 mesh are fed to a carbonizer wherein they are maintained, at carbonization temperature, in the form of a dense turbulent fluidized bed of finely divided solids forming a well defined upper level. The heat required for carbonization is supplied either by blowing superheated steam, hot product gas or flue gas upwardly through the bed or by burning a portion of the combustible constituents of the charge with the aid of an oxidizing combustion-supporting gas such as air and/or oxygen passed upwardly through the bed. The combined action of the gas supplied and the volatile products of the carbonization reaction causes proper fluidization at superficial gas velocities within the carbonizer of about 0.3–10 ft. per second.

Volatile products are withdrawn overhead while the coke is recovered from the upwardly flowing vapors and/or from a fluidized solids stream leaving the carbonizer in a downward direction under the pseudo-hydrostatic pressure of the dense fluidized carbonization bed.

The advantages of this procedure over fixed bed operation are great in number and importance. The temperature throughout the carbonization bed is perfectly uniform and may be easily controlled over the wide range of from say 700° to about 2000° F. The yields of tar, light oils, gas and coke are substantially improved and may be readily varied with respect to product qualities and relative product amounts by suitable variations of temperature and/or pressure. The process may be made fully continuous and may be applied to any type of carbonizable charge. There is highest flexibility with respect to the type of heating employed. Investment and operating cost is likewise more favorable as compared with fixed bed operation.

However, the smooth continuous operation of "fluid" type carbonizers has been considerably impeded by difficulties arising in connection with the separation of solids fines from the product gases. An efficient gas-solids separation is necessary to avoid carbon losses as well as to facilitate tar recovery. The conventional cyclone type gas-solids separators are located in the top of the carbonization vessel or outside the carbonization vessel ahead of the tar recovery system, and separated solids are recovered or returned to the dense carbonization bed. Serious plugging difficulties are encountered in the operation of systems of this type resulting from the condensation of heavy tar constituents at the rapidly decreasing temperatures prevailing in the dilute phase above the dense phase level and in the cyclone separators. Deposition of highly viscous or solid substances may also be caused by polymerization of hydrocarbon vapors ahead of or within the cyclone separators. These deposits have to be removed at frequent intervals requiring shutdowns of the plant and preventing continuous runs of commercially desirable length.

The present invention overcomes the aforementioned difficulties and affords various additional advantages as will be fully understood from the following detailed description read with reference to the accompanying drawing.

It is, therefore, the main object of the present invention to provide improved means for carbonizing carbonaceous fuels in a system employing the fluid solids technique.

Another object of this invention is to provide improved means for preventing the plugging of gas-solids separators used in a carbonization system employing the fluid solids technique.

Other and further objects will become apparent from the following disclosure and claims.

I have found that the aforementioned objects and advantages may be accomplished, quite generally, by maintaining the gas-solids separation zone in so close a proximity to the dense fluidized bed of solids undergoing carbonization that the vapor temperature within the separation zone is sufficiently high to prevent substantial condensation of vapors ahead of or within the separation zone. Best results are obtained when the temperature in the separation zone closely approaches that of the dense bed. This effect may be realized by placing the separation zone within the carbonizer immediately above the upper level of the dense bed the height of which is controlled by controlling the ratio between solids feed and withdrawal to and from the carbonization bed.

In this manner substantial heat losses of the vapors prior to their reaching the separation zone are avoided and the temperature of the separation zone is maintained at or close to the carbonization temperature which lies necessarily above the condensation temperature of the heaviest volatile products. In addition, the time for which the volatile products are maintained at polymerization temperatures on their way from the fluidized bed through the separator to the tar recovery equipment is considerably decreased.

When the temperature control thus accomplished is insufficient completely to prevent tar deposits, the rate of solids circulation through the separation zone may be raised so as to increase the mechanical scouring or scrubbing effect of the solid particles on the separator walls. Solids carry-over into the separation zone may be controlled by adjusting the dense bed level which, on its part, is a function of the superficial gas velocity at any given solids feed and withdrawal rate.

If it is desired to vary solids circulation through the separation zone without affecting the bed level or the overall superficial gas velocity within the carbonizer, a separate stream of solids may be injected from the dense bed into the separation zone with the aid of a separate gas stream.

Having set forth the general nature and objects, the invention will be best understood from the more detailed description hereinafter, in which reference will be made to the accompanying drawing wherein the single figure is a semi-diagrammatic illustration of a system suitable for carrying out a modification of the present invention.

Referring now in detail to the drawing, the numeral 10 designates a vertical carbonizer vessel designed for fluid solids operation. The gas-solids separation zone in the form of a conventional cyclone separator 20 is arranged in the top of carbonizer 10 and provided with a solids withdrawal line 22 and an auxiliary solids draft tube 25. Separated solids may also be returned to the carbonization bed through pipe 30. A distributing grid 15 separates the substantially cylindrical main section of carbonizer 10 from its lower conical end.

In operation, finely divided carbonizable solids such as a carbonization coal having a particle size between about 4 and 400 mesh, preferably between 50 and 200 mesh although larger sizes of say up to ¼–½ in. may be used, is supplied to carbonizer 10 through line 1 by any suitable means known per se such as an aerated standpipe, a pressurized feed hopper, a mechanical conveyor, etc. (not shown). A preheated gas such as superheated steam, hot make gas or flue gas or an oxidizing gas such as air and/or oxygen is supplied by compressor 2 through line 4 to receiver 6 thence to the lower conical section of carbonizer 10 and enters the latter through grid 15 to heat the finely divided charge to carbonization temperatures which may vary between about 800° and 2000° F. depending on the products desired. When an oxidizing gas is used, sufficient oxygen is made available to cause a partial combustion which will generate at least a substantial portion of the heat required for carbonization.

The feed rate of solids and the superficial velocity of the gas supplied through line 4 may be so controlled that the charge of carbonizer 10 is maintained at carbonization conditions of residence time and temperature in the form of a dense turbulent fluidized solids bed having an upper level $L_{10}$ in close proximity to cyclone separator 20. Solids feed rates of about 100 to 1000 lbs. of coal per hour per sq. ft. of carbonizer cross-sectional area in combination with gas velocities of about 1 to 10 ft. per sec. are generally suitable to reduce the distance between level $L_{10}$ and the inlet to separator 20 to the desired magnitude of about 0.5 to 10 ft. As a result of the small dimension of the dilute phase above level $L_{10}$ the temperature drop through the dilute phase is minimized and the condensation of heavy products in cyclone separator 20 is substantially avoided. Any condensate deposited on the cyclone walls is scrubbed and adsorbed by the coke particles entering cyclone 20 which in this case includes all the solids produced in carbonizer 10. In addition, the total residence time of the volatile products in carbonizer 10 is considerably shortened because of the smaller size of the dilute phase so that polymerization is substantially subpressed. Volatile products are withdrawn overhead from separator 20 through line 23 and coke may be recovered through pipe 22.

If it is desired to increase the scrubbing effect of the solids and/or the rate of heat transfer to the cyclone, a suitable conveying gas such as superheated steam may be injected through line 27 into the lower open end of draft tube 25 to carry additional solids into cyclone 20 in the manner of an internal recycle using solid return pipe 30, without changing the flow conditions in carbonizer 10. The effect of this internal recycle may be further increased by introducing small amounts of a combustion-supporting gas such as air and/or oxygen into draft tube 25 to generate additional heat therein by a limited combustion and/or exothermic oxidation of gaseous and/or solid combustibles present in tube 25.

When operating as described above the minimum amount of solid entering cyclone 20 must be equal to the total amount of solid carbonization product of carbonizer 10. This amount of solids may be greater than required for proper heat transfer and scrubbing action in cyclone 20; it also may cause excessive carry-over of solids to the tar recovery system which is undesirable. In these cases the proximity of level $L_{10}$ to cyclone 20 and thus the amount of solids entering cyclone 20 is preferably controlled by providing for a bottom drawoff of carbonized solids from carbonizer 10 through a downflow standpipe 35 or the like and controlling level $L_{10}$ at any desired superficial gas velocity and solids feed rate by properly adjusting solids withdrawal through pipe 35. In this manner just sufficient amounts of solids are permitted to enter cyclone 20 as will prevent plugging thereof while solids carry-over into the tar recovered may be effectively reduced.

My invention will be further illustrated by the following specific example.

*Example*

Operating conditions for the carbonization of Pittsburgh Seam-bituminous coal containing 5% moisture, without plugging of the gas-solids separation equipment in a system of the type illustrated in the drawing may be chosen as given below.

| | |
|---|---|
| Carbonizer temperature °F | 900 |
| Dilute phase pressure p. s. i. g | 0.5 |
| Coal feed rate lbs./hr | 2000 |
| Coal feed rate lbs./hr./sq. ft. | 250 |
| Coal feed temperature °F | 60 |
| Coal particle size: | |
|   On 8 mesh per cent | 0.2 |
|   On 14 mesh do | 22.2 |
|   On 48 mesh do | 77.2 |
|   On 100 mesh do | 88.8 |
|   On 200 mesh do | 96.2 |
|   Through 200 mesh do | 3.8 |
| Air to carbonizer (at 150° F.) S. C. F. M | 175 |
| Superficial gas velocity at top of bed ft./sec | 1.5 |
| Distance from bed level to inlet of cyclone ft | 3 |

| | |
|---|---|
| Solids concentration in gas entering cyclone _____ lb./C. F__ | 0.01 |
| Solids concentration in bed_____lbs./cu. ft__ | 15 |
| Solids concentration in gases leaving cyclone _____ lb./cu. ft__ | 0.0015 |
| Solids withdrawn through bottom drawoff line _____lbs./hr__ | 1435 |
| Yield, lbs./100 lbs. of raw coal: | |
| Coke _____ | 72.9 |
| Light oils _____ | 0.6 |
| Dry gas _____ | 40.9 |
| Tar _____ | 7.3 |
| Liquor + loss _____ | 15.7 |

In the foregoing description I have referred primarily to a solid carbonaceous feed material such as coal, however, it is noted that aside from other solid carbonaceous materials such as brown coal, lignite, oil shale, cellulosic materials, etc. such carbonaceous materials as are liquid at the carbonization conditions, for instance crude petroleum, heavy petroleum residue, or pitch, asphalt or the like may be used. In the latter case, a dense fluidized bed of a finely divided carrier material such as coke, sand, or the like is maintained in carbonizer 10 and the liquid carbonaceous charge is sprayed and carbonized on said carrier material which is maintained at carbonization temperature substantially as explained above.

The carbonization of all carbonizable materials mentioned above may be carried out continuously at atmospheric or elevated pressures ranging as high as about 400 lbs. per sq. in. or higher. Pressures from atmospheric to 200 lbs. per sq. in. being generally preferred.

The foregoing description and exemplary operations have served to illustrate specific applications and results of my invention. However, other modifications obvious to those skilled in the art are within the scope of my invention. Only such limitations should be imposed on the invention as are indicated in the appended claims.

I claim:

1. In the process of carbonizing carbonizable fuels at carbonization conditions of temperature and pressure in the form of a dense turbulent bed of finely divided solids fluidized by an upwardly flowing gas wherein volatile carbonization products carrying entrained solids fines are passed through a gas-solids separation zone to remove entrained finely divided solids therefrom and a heat transfer is provided for between said bed and said separation zone sufficient to prevent a substantial temperature drop between said bed and said separation zone, the improvement which comprises passing a separate stream of solids at a temperature at least as high as that prevailing in said bed from said bed directly to said separation zone.

2. A method for carbonizing carbonizable fuels which comprises maintaining a dense fluidized bed of finely divided solids at carbonizing conditions of temperature and pressure, feeding finely divided carbonizable fuel to said bed, passing gas upwardly through said bed at a rate sufficient to maintain it in a fluidized condition while forming a well defined upper level, removing carbonization products from said upper level, passing said products through a separation zone to separate solids from vapors independently passing a stream of solids at a temperature at least as high as that prevailing in said bed from said bed to said separation zone and providing for a heat transfer between said bed and said separation zone sufficient to keep the temperature in said separation zone high enough to prevent substantial condensation of product vapors.

3. The process as claimed in claim 2 wherein said bed is maintained within a confined space and said separation zone is arranged within said confined space immediately above said upper level.

4. The process as claimed in claim 2 wherein at least a substantial proportion of solid carbonization products is withdrawn in a downward stream directly from said bed.

5. The process as claimed in claim 2 wherein solids enter said separation zone in sufficient quantities to exert an appreciable mechanical scrubbing action on the walls of said separation zone.

6. The process as claimed in claim 2 wherein combustion-supporting gas is added to said stream.

7. Apparatus for carbonizing carbonizable fuels which comprises a vertical vessel adapted to hold a dense turbulent bed of fluidized solids having a well defined upper level, a gas-solids separation zone within said vessel, arranged in efficient heat exchange relationship with said bed, means for introducing finely divided carbonizable fuels into said vessel, means for introducing a gas to the bottom of said vessel, means for withdrawing vapors and solid carbonization products from a portion of said vessel above said level, means for passing vapors and solid carbonization products from said portion to said separation zone, means independent of said vapor passing means for passing solids directly from said bed to said separation zone, means for withdrawing vapor products from said separation zone and means for withdrawing solid products from said separation zone.

8. Apparatus as claimed in claim 7 wherein said separation zone is arranged immediately above said level.

9. Apparatus as claimed in claim 7 comprising means for downwardly withdrawing solid carbonization products directly from said bed.

KARL J. NELSON.

REFERENCES CITED

The following references are of record in the file of this patent:

UNITED STATES PATENTS

| Number | Name | Date |
|---|---|---|
| 1,983,943 | Odell _____ | Dec. 11, 1934 |
| 1,984,380 | Odell _____ | Dec. 18, 1934 |
| 2,327,175 | Conn _____ | Aug. 17, 1943 |
| 2,334,553 | Harding _____ | Nov. 16, 1943 |
| 2,337,684 | Scheineman _____ | Dec. 28, 1943 |
| 2,367,281 | Johnson _____ | Jan. 16, 1945 |
| 2,379,448 | Linn _____ | July 3, 1945 |
| 2,384,356 | Tyson _____ | Sept. 4, 1945 |
| 2,389,299 | Alther _____ | Nov. 20, 1945 |
| 2,391,334 | Nicholson _____ | Dec. 18, 1945 |
| 2,391,434 | McAfee _____ | Dec. 25, 1945 |
| 2,414,586 | Egloff _____ | Jan. 21, 1947 |
| 2,417,973 | Degnen _____ | Mar. 25, 1947 |
| 2,420,049 | Martin _____ | May 6, 1947 |
| 2,448,135 | Becker _____ | Aug. 31, 1948 |
| 2,493,494 | Martin _____ | Jan. 3, 1950 |

FOREIGN PATENTS

| Number | Country | Date |
|---|---|---|
| 301,974 | Great Britain _____ | Dec. 13, 1928 |
| 335,740 | Great Britain _____ | Oct. 2, 1930 |

OTHER REFERENCES

"The Oil and Gas Journal," pages 64–81, Mar. 3, 1945.

"Improvements Increase Efficiency of Fluid Catalyst-Cracking Process," Murphree et al.